O. EVENSEN.
SPEED GAGE.
APPLICATION FILED MAR. 22, 1910.
983,127.
Patented Jan. 31, 1911.
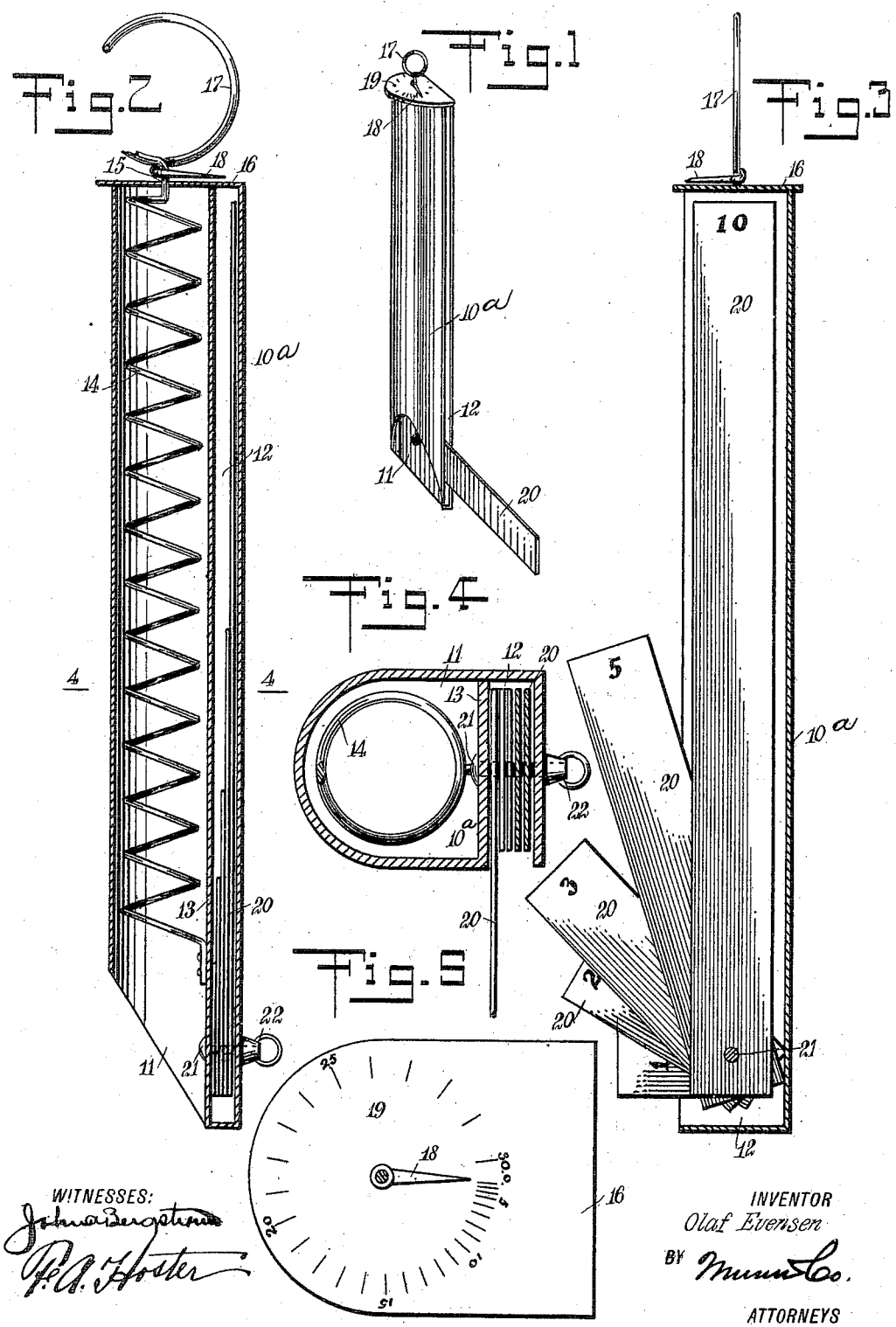
INVENTOR
Olaf Evensen
BY
ATTORNEYS

UNITED STATES PATENT OFFICE.

OLAF EVENSEN, OF MONTREAL, QUEBEC, CANADA.

SPEED-GAGE.

983,127.  Specification of Letters Patent.  Patented Jan. 31, 1911.

Application filed March 22, 1910. Serial No. 550,850.

*To all whom it may concern:*

Be it known that I, OLAF EVENSEN, a subject of the King of Norway, and a resident of Montreal, in the Province of Quebec, Dominion of Canada, have invented a new and Improved Speed-Gage, of which the following is a full, clear, and exact description.

My invention relates to speed gages, such as are more particularly used for nautical purposes, as in determining the speed of a boat or the speed of a current. For the purpose mentioned, use is made of a casing provided with a torsion spring, and indicating means controlled by the spring, together with blades pivotally mounted in the casing and adapted to be swung outwardly at right angles to the casing, the said blades being adapted to have a force exerted against them, the speed of which is indicated by the indicating means.

Reference is to be had to the accompanying drawings forming a part of this specification, in which similar characters of reference indicate corresponding parts in all the views, and in which—

Figure 1 is a perspective view of my device showing the same in position for use; Fig. 2 is a sectional side view showing the inner construction; Fig. 3 is a sectional elevation showing the various sized blades pivotally mounted on the casing; Fig. 4 is a sectional view taken on the line 4—4 in Fig. 2; and Fig. 5 is a plan view of my device with the handle removed, and a part in section.

Referring more particularly to the various figues, I employ a casing 10ª, preferably divided into compartments 11 and 12 by a partition 13. A torsion spring 14 is secured to the lower part of the partition 13 and extending upwardly passes through an opening 15 in the top 16 of the casing 10ª, and terminates in a rounded handle 17, the end of which is fashioned into an index 18 adapted to operate over a scale 19 on the top 16. In the second compartment 12, a series of blades 20 of varying lengths is provided and pivotally mounted in the casing 10ª by means of a pivot pin 21, provided with a handle 22. The blades 20 are adapted to move outwardly from the casing to a position at right angles to the casing, as may be easily seen by referring to Fig. 1.

Now, it is obvious that the resistance of water against a blade is in direct proportion to the square of the velocity of the water, or in other words, equal to a column of water with a base equal to the size of the blade and a height equal to the distance it would have to fall to get the same velocity as the current. For this reason various sized blades are employed and more accurate readings are derived, and as the scale 19 is graduated to miles per hour, a proportion must exist between the scale 19 and the various blades marked 1, 2, 3, 5 and 10. Therefore, when it is desired to determine the speed of a current in miles per hour, the gage is lowered vertically into the water with one of the blades 20 extending outwardly at right angles to the casing, as will be seen by referring to Fig. 1. Now, the water pressing against the blade will tend to swing it lengthwise with the stream so that by turning the handle 17 to operate against the current the blade will be brought at right angles to the current and the reading on the scale at this moment, divided by the size of the blade, will result in the number of miles per hour of the current. For instance if the 10 blade is used and the scale reading is 30, the speed of the current will be 3 miles per hour. If a smaller blade is used for the same current the scale reading, owing to the lesser resistance of the blade, will be lower, and by dividing this reading by the size of the blade the same result approximately, will be derived, as when a larger blade was used. It will be seen that the blades can be made of any convenient length or width, provided the scale is graduated proportionately.

It may be found, at times, that the current is beyond the reach of a person's arm, that is, the distance to the surface of the water is too great to be reached by a person in a high-sided boat or the like. In this case, when it is desired to use my device to obtain a reading of the strength of the current, a stick is attached to the handle 17 and a piece of tin, or the like, provided with a scale, similar to the scale shown in Fig. 5, is mounted on the upper end of the stick so that the stick will turn with the handle and the scale will remain stationary. Thus it will be seen that if a pointer is mounted in the stick and adapted to move therewith over the auxiliary scale, the reading indicated by the pointer will be the same as if the reading were taken as described heretofore. Now, by tying a string or cord to the handle 22, the gage can be easily lowered into the water and held in a vertical position against the current by keeping the stick approximately vertical and holding the cord taut, and the reading can be taken on the auxiliary scale on the stick and opposite to the blade used.

Although I have shown the blades of my gage graduated to specified lengths, it will be readily seen that the same can be varied; and it will be understood that I do not confine myself to the construction of my speed gage as shown, the scope of my invention being fully set forth and defined in the appended claims.

Having described my invention, I claim as new and desire to secure by Letters Patent,—

1. A speed gage, comprising a casing having a partition forming compartments, torsion means in one of the compartments, indicating means controlled by the torsion means, and resisting means mounted in the other compartment and adapted to swing at right angles to the casing.

2. A speed gage, comprising a casing having a partition forming compartments, torsion means in one of the compartments, indicating means controlled by the torsion means, and blades mounted in the other compartment and adapted to swing at right angles to the casing.

3. A speed gage, comprising a casing having a partition forming compartments, a torsion spring in one of the compartments, indicating means controlled by the spring, and resisting means mounted in the other compartment and adapted to swing at right angles to the casing.

4. A speed gage, comprising a casing provided with an opening and having a partition forming compartments, torsion means in one of the compartments and secured thereto, indicating means controlled by the torsion means, and resisting means mounted in the other compartment and adapted to swing outwardly through the opening at right angles to the casing.

5. A speed gage, comprising a casing provided with an opening and having a partition forming compartments, torsion means in one of the compartments and secured thereto, indicating means exterior of the said compartment and controlled by the torsion means, and resisting means mounted in the other compartment and adapted to swing outwardly through the opening at right angles to the casing.

6. A speed gage, comprising a casing provided with an opening and having a partition forming compartments, torsion means in one of the compartments and secured thereto, indicating means controlled by the torsion means, and blades mounted in the other compartment and adapted to swing outwardly through the opening at right angles to the casing.

7. A speed gage, comprising a casing provided with an opening and having a partition forming compartments, torsion means in one of the compartments and secured thereto, indicating means exterior of the said compartment and controlled by the torsion means, and blades mounted in the other compartment and adapted to swing outwardly through the opening at right angles to the casing.

8. A speed gage, comprising a casing provided with an opening and having a partition forming compartments, a spring in one of the compartments and secured thereto, indicating means exterior of the said compartment and controlled by the torsion means, and blades mounted in the other compartment and adapted to swing outwardly through the opening at right angles to the casing.

9. A speed gage, comprising a casing having longitudinal compartments therein, a torsion spring in one of the compartments, blades pivotally mounted in the other compartment and adapted to swing at right angles to the casing, indicating means exterior of the casing and controlled by the said spring, and a handle mounted to turn with the spring and secured at one end of the same.

In testimony whereof, I have signed my name to this specification in the presence of two subscribing witnesses.

OLAF EVENSEN.

Witnesses:
H. GUTHER,
A. P. G. GLASSCO.